United States Patent [19]

Roques et al.

[11] Patent Number: 5,006,260

[45] Date of Patent: Apr. 9, 1991

[54] COALESCER DEVICE AND METHOD USING MOVABLE FILLING

[75] Inventors: Henri Roques, Portet S/Garonne; Yves Aurelle, Aucamville; Louis Lopez, Portet sur Garonne, all of France

[73] Assignee: Institut National des Sciences Appliquees de Toulouse, Toulouse, France

[21] Appl. No.: 368,343

[22] PCT Filed: Nov. 18, 1987

[86] PCT No.: PCT/FR87/00454

§ 371 Date: May 26, 1989

§ 102(e) Date: May 26, 1989

[87] PCT Pub. No.: WO88/03831

PCT Pub. Date: Jun. 2, 1988

[30] Foreign Application Priority Data

Nov. 28, 1986 [FR] France ............... 86 16784

[51] Int. Cl.⁵ .................................. B01D 17/04
[52] U.S. Cl. .................... 210/708; 210/382; 210/365; 210/520; 210/DIG. 5
[58] Field of Search ........... 210/693, 799, 924, 382, 210/520, DIG. 5, 365, 367, 260, 528, 708

[56] References Cited

U.S. PATENT DOCUMENTS

| 2,438,244 | 3/1948 | Biazzi | 252/349 |
|---|---|---|---|
| 3,256,997 | 6/1966 | Pall et al. | 210/DIG. 5 |
| 3,617,555 | 11/1971 | Ginsburgh et al. | 210/693 |
| 3,794,583 | 2/1974 | Rhodes | 210/DIG. 5 |
| 3,948,768 | 4/1976 | Chapman | 210/799 |
| 4,167,482 | 9/1979 | Muller | 210/799 |
| 4,199,447 | 4/1980 | Chambers et al. | 210/DIG. 5 |
| 4,264,450 | 4/1981 | Ayers et al. | 210/693 |
| 4,332,854 | 6/1982 | Parker | 210/924 |
| 4,406,793 | 9/1983 | Kruyer | 210/693 |
| 4,411,791 | 10/1983 | Ward | 210/DIG. 5 |
| 4,416,782 | 11/1983 | Kerres | 210/693 |
| 4,429,065 | 1/1984 | Gancy | 210/693 |
| 4,640,781 | 2/1987 | Hughes | 210/DIG. 5 |

FOREIGN PATENT DOCUMENTS 1055761 1/1967 United Kingdom .

Primary Examiner—Stanley Silverman
Assistant Examiner—Cynthia L. Nessler
Attorney, Agent, or Firm—Harold H. Dutton, Jr.

[57] ABSTRACT

The invention relates to a process and an apparatus for the separation of a dispersed phase in emulsion or in suspension in a continuous phase of a different density. The process comprises causing the emulsion to circulate in a coalescing enclosure (1) containing a filling (11) having an inherent volume of particles or fibers which is slight with respect to the useable volume of the enclosure, and causing the filling to move with respect to the emulsion in such a manner that the particles or fibers thereof sweep the enclosure with an average speed which is high with respect to the flow speed of the emulsion in the enclosure. The invention is particularly applicable for the separation of hydrocarbons or fatty bodies dispersed in an aqueous effluent.

13 Claims, 3 Drawing Sheets

COALESCER DEVICE AND METHOD USING MOVABLE FILLING

The invention relates to a process for separation of a dispersed phase in emulsion or in suspension in a continuous phase of a different density. The invention also relates to a separation device for carrying out the process and applying the process in particular, but not exclusively, to the separation of hydrocarbons or fatty compounds dispersed in an aqueous effluent.

The crude petroleum oil recovered by "offshore" platforms always contains relatively significant quantities of water and a non-negligible percentage of materials in suspension (colloidal materials, fine particles). The separation of the hydrocarbon and the water must be achieved as soon as possible in order, firstly, to return to the ocean a purified aqueous phase without creating a nuisance, and also to assure the pumping of a hydrocarbon phase free from water in such a manner as to avoid wasting of energy and avoid corrosion problems in the conduits caused by the presence of salt water. The problem presents itself in the same manner on gas producing platforms where the fraction of liquid recovered comprises light hydrocarbons mixed with salt water.

Therefore, it is necessary to achieve a high separation efficiency, and it is considered satisfactory in these applications to carry out a separation obtaining in one phase less than 100 mg/l (milligrams per liter) of the other phase.

Actually, taking into consideration the suspended materials which the effluents contain, this performances is generally obtained by a two-step treatment carrying out in successive steps, in separate installations: a primary treatment essentially achieved in decanters, which permits the separation of droplets of a size greater than 150 microns and a secondary treatment generally achieved in induced-air flotation devices, which separates the droplets of smaller sizes and reduces the residual content in the dispersed phase to a value less than 100 mg/l.

These installations present the serious drawback of being very cumbersome, by reason of the two-step treatment carried out and the fact that each phase of treatment itself requires a voluminous apparatus: decanters of which the performance is related to the surface, and large and heavy flotators. This drawback is particularly serious for installations intended to be provided on platforms, where the space is limited and costly. Moreover, the induced air flotators are large energy users and require the use of adjuvant chemicals (de-emulsifiers, coagulants) for neutralizing the stabilizing action of the additives which are generally injected at the top of the well (anti-corrosion agents, anti-foaming agents . . . ).

Coalescers with fibrous or granular fillings are known, in particular beds of oleophilic resins, which give excellent separation performance, but are very sensitive to suspended materials and require delicate regeneration cycles to be carried out. As a result, filled coalescers are generally not used for effluents which are heavily loaded with suspended materials and in any event require a dual installation for working continuously, one installation operating in the separation cycle while the other is in the regeneration cycle.

The present invention proposes to provide a new process and a new device for separation, by coalescence, of a hydrocarbon phase in emulsion in an aqueous phase, and seeks to suppress the drawbacks hereinabove indicated for known processes and installations.

In a more general manner, the invention provides an improved process and apparatus for the separation of all dispersed phase in emulsion or in suspension in a continuous phase of a different density.

An essential object of the invention comprises in particular the carrying out of the separation in a single step with a separation efficiency greater than that of the conventional dual treatment mentioned above.

Another essential object is to provide a separation device which is less sensitive to suspended materials and, as a result, is able to operate continuously and permanently, without a regeneration step.

Another object is to provide a very compact apparatus, consuming little energy.

Another object is to provide a device capable of treating the effluents directly without the need for chemical additives.

The separation process provided by the invention is of the type comprising causing the emulsion to circulate in a coalescing enclosure containing a filling in a divided state formed by fibers or particles, and in recovering separately the coalesced phase and the continuous phase at different levels in the enclosure. According to the present invention, a filling is used having an inherent volume of particles or fibers which is low with respect to the useable volume of the coalescing enclosure and causing the filling to move with respect to the emulsion circulating in the enclosure in such a manner that the particles or fibers of the filling sweep the enclosure with an average speed which is high with respect to the flow speed of the emulsion in the enclosure.

By "inherent volume of particles or fibers" is meant the volume of material forming these elements exclusive of the interstitial spaces between them. Moreover, by "useable volume of the coalescing enclosure" is meant the volume available for the passage of the emulsion to be treated, which is swept by the particles or fibers of the filling.

The particles or fibers of the filling may be contained in a movable matrix, the volume of which corresponds to the overall useable volume of the enclosure: in this case, the specific coefficient of void of this filling has a high value. It is also possible to arrange the fibers or particles in a movable matrix of which the volume is less than the useable volume of the enclosure, (this matrix sweeping said useable volume at the center of its movement). In this case, the specific coefficient of void of the matrix may be less high.

In practice, a filling is used having an inherent volume of particles or fibers less than about 20% of the useable volume of the coalescing enclosure. Further, the filling is preferably placed in movement in the enclosure in such a manner that the average speed of its particles or fibers is greater that about 100 times the flow speed of the emulsion.

Experiments carried out on the separation of hydrocarbons and water have shown that the process of the invention combines a remarkable efficiency of separation, enabling achievement of residual concentrations of dispersed phases much less than 100 mg/l, and a very low sensitivity to the presence of suspended materials permitting carrying out the process continuously, without any particular precaution.

These performances seem paradoxical, especially in respect of the efficiency of separation. In effect, creating a movement in an effluent in the midst of which one seeks a coalescing effect, is a concept which shocks good sense, since generally the effect of agitation produces an opposite effect of breaking up droplets which antagonize the effect of coalescence. Moreover, it is well known that coalescers with a high coefficient of void have mediocre separation performance, not permitting, in any case, achieving the norms of separation sought.

The performances of the process of the invention, a priori unexpected, seem to be explainable as follows. The relative movement of the high speed of the particles or fibers with respect to the emulsion leads to two phenomena of opposite effects: a tendency to re-fractionate mentioned above, and a strong increase of the probability of droplets encountering either other droplets or fibers or particles, this latter phenomenon tends to reinforce the effect of coalescence. When the speed of the fibers or particles with respect to the emulsion is high, it has been verified that the effect of coalescence greatly exceeds the tendency to refractionate, which explains the remarkable overall performances obtained.

Thus, the process of the invention permits, by means of the fillings with high coefficient of void (therefor only slightly sensitive to suspended materials), the production in a single step of a very effective separation.

In practice, for a filling comprised of fibers, the inherent volume of the fibers is preferably adjusted to between 0.5% and 5% of the useable volume of the enclosure, the fibers being placed in movement at an average speed approximately between 150 and 300 times the flow speed of the emulsion.

According to a preferred embodiment, the emulsion is caused to circulate in the enclosure parallel to an axis and the movement of the filling comprises movement of the latter in rotation around this axis, in such a manner that the fibers or particles sweep the useable volume of the enclosure with an average tangential speed (at mid-radius) which is high with respect to the axial flow speed of the emulsion.

The invention also relates to a device for carrying out the process indicated above. This apparatus is of a type comprising a coalescing enclosure, an emulsion inlet situated toward one end of the enclosure, a coalesced phase outlet and a continuous phase outlet, both situated toward the opposite end of the enclosure but at different levels. According to the present invention, the apparatus comprises a rotating support associated with the coalescing enclosure, means for causing the rotation of the support, and a filling formed by fibers, the fibers being connected to the rotating support and arranged in such a manner as to sweep the volume of the enclosure during the rotation thereof.

The inherent volume of the fibers of the filling is advantageously between about 0.5% and 5% of the useable volume of the enclosure.

The means for causing rotation of the support are preferably adapted to permit assurance of rotation of the rotating support such that:

$$\frac{750}{D} \leq N \leq \frac{1500}{D},$$

where N is the speed of rotation expressed in revolutions per minute, and D is the average diameter of the enclosure expressed in cm.

These rotational speeds correspond to average tangential speeds which seem optimal for obtaining a very strongly predominant coalescing effect with respect to the refractionating effect.

The filling may assume various forms of realization: a multitude of radial fibers connected to a central shaft to form a brush of a spiral form or a linear brush, a sheet of woven or felted fibers having a longitudinal half-section or full section of the enclosure . . . .

The diameter of the fibers used is advantageously chosen to be between 0.1 and 0.5 mm.

The description which follows with reference to the annexed drawings, presents one embodiment and variations of the apparatus according to the invention and gives examples of operation by means of this device for illustrating the process of the invention. In these drawings which form an integral part of the present description:

Figure 1:
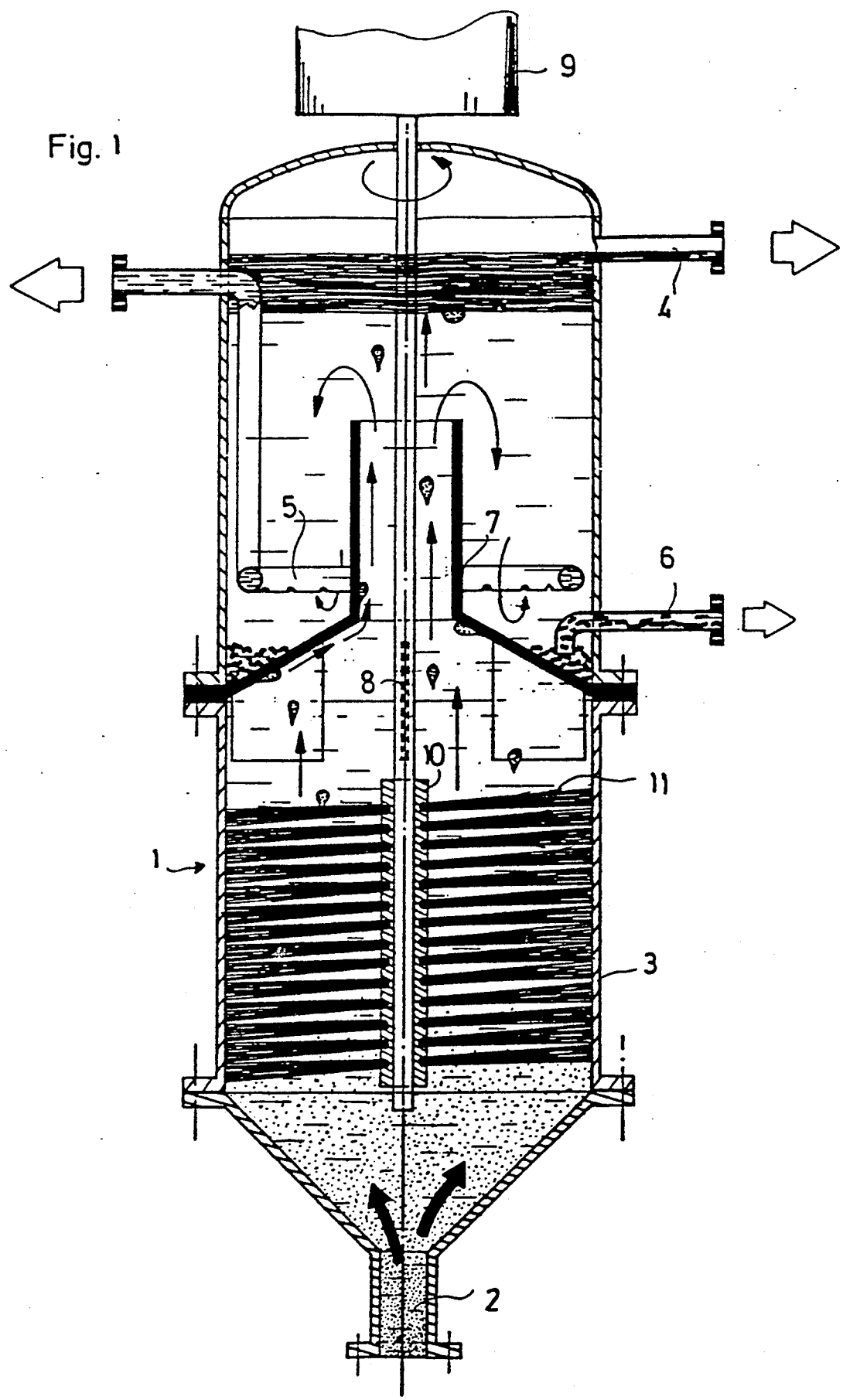
FIG. 1 is a cross-section through a vertical axial plane of an apparatus according to the invention.
Figure 2:
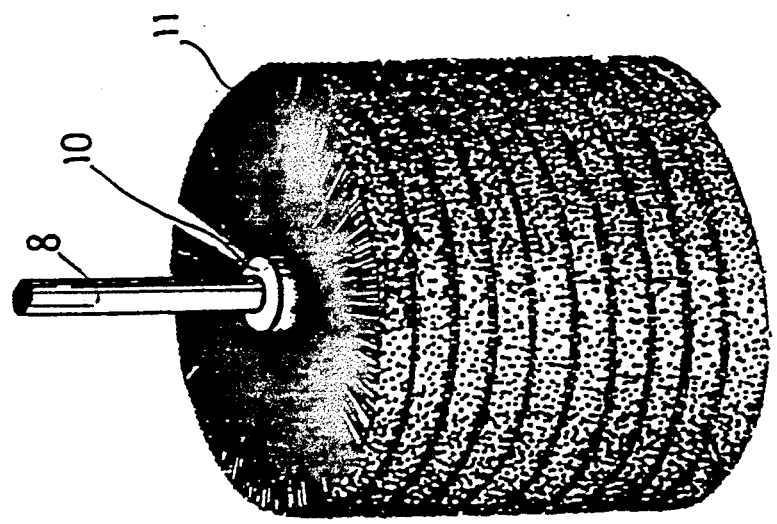
FIG. 2 is a schematic view in perspective of the filling equipping this apparatus.

The apparatus shown by way of example in FIGS. 1 and 2 is intended to separate a dispersed phase, particularly a hydrocarbon, in emulsion or in suspension in a continuous phase of a different density, especially aqueous. The case being, the effluent may contain materials in suspension.

This apparatus comprises a cylindrical coalescing enclosure 1 with a vertical axis, formed in the example from three sections secured one to the other. A lower section provided with an emulsion inlet 2, an intermediate section defining a useable volume in the enclosure, and an upper section provided with a coalesced phase outlet 4 in the upper part, a continuous phase outlet 5 situated at a lower level, and a suspended material outlet 6 situated at the bottom of this upper section. The effluent to be treated is sent into the enclosure through the inlet 2 with a flow adjusted as a function of the axial flow speed desired at the interior of the enclosure, the effluent circulating from the bottom to the top in the useable volume thereof.

In the example, the intermediate portion and the upper portion are separated by a guide 7 having the form of an inverted funnel. The outlet 4 permits recovery by overflowing of the less dense disperse phase. The outlet 5 which has a perforated circular collector extends by an evacuation conduit permitting recovery of the continuous phase. The materials in suspension entrained in the continuous phase toward the upper portion are deposited above the guide 7 and may be evacuated sequentially or continuously by the outlet 6.

The enclosure 1 is provided with a vertical rotating shaft 8 which extends along its axis and traverses its upper wall for being coupled to the driveshaft of a motor 9. The motor may be fixed by its feet above the enclosure.

In the examples described below, the enclosure 1 has a diameter of 5 cm and the motor 9 is an electric motor permitting varying the speed of rotation of the shaft 8 up to a value on the order of 300 rpm.

In its lower portion situated at the level of the useable volume of the enclosure, the shaft 8 carries a sleeve 10 fixed thereon, which is provided with a multitude of fibers 11 spirally wound along the shaft to form a brush which is seen in perspective in FIG. 2. These fibers have a length adapted such that their free extremity comes into contact with the enclosure so as to sweep at the center of rotation the useable volume thereof.

The fibers of filling are of a material preferentially wetted by the dispersed phase, in particular polypropylene, polyethylene, polyamide, polytetrafluoroethylene . . . , in the case of separation of hydrocarbon/water. Their diameter is advantageously between about 0.1 and 0.5 mm.

The density of the fibers of each spiral and the pitch of the spiral are provided such that the volume of material relative to the useable volume of the enclosure is less than 20%.

In examples 4, 5 and 6 below, this ratio was 17%, in example 7 it was 13%, and in example 8 it was 11%. This very open structure connected to the displacement of the fibers permits a filling to have very low sensitivity to materials in suspension which traverse the filling without clogging.

Figure 3:
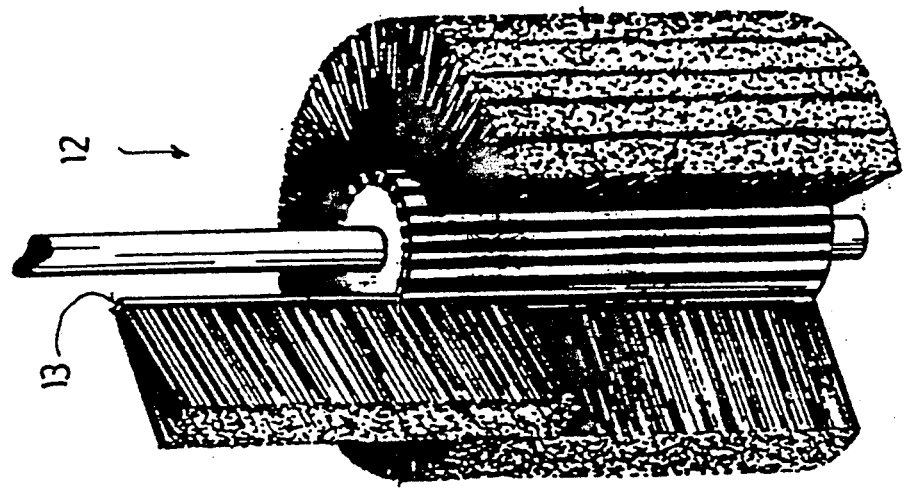
FIGS. 3, 4 and 5 are schematic perspective views of variations of the filling capable of equipping the apparatus.

FIG. 3 shows another embodiment of the filling 12 achieved by means of analagous fibers which are attached along a linear support 13 inserted into a groove of a central sleeve. These fibers thus form linear brushes each of which extends along a generatrix of the shaft. A single brush, or several, may be provided as shown in FIG. 3. The density of each brush and their connection around the shaft are adjusted as before such that the volume of material relative to the useable volume is less than 20%.

Figure 4:
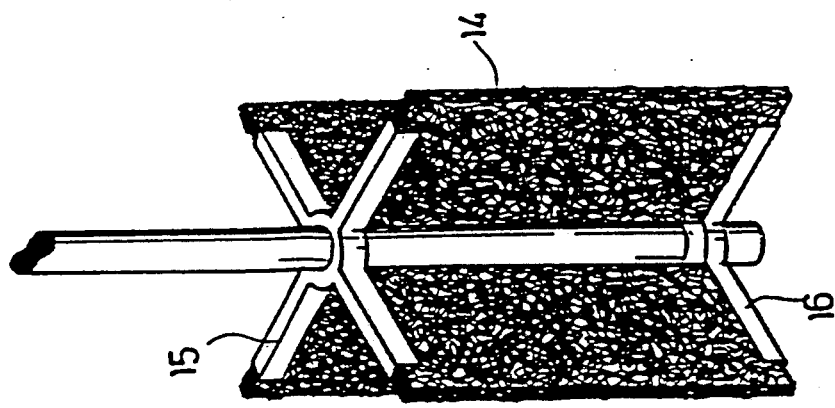

FIG. 4 presents another variation of filling. This is formed of sheets of felted fibers 14, maintained around the central shaft by upper arms 15 and lower arms 16 fixed on the shaft. In the example, four sheets are provided, each covering a longitudinal half-section of the enclosure. A different number of sheets may well be provided, the ratio of the volume of material to the useable volume of the enclosure being adjusted as before so as to be less than 20%. In the examples 1, 2 and 3, this ratio was 2%.

Figure 5:
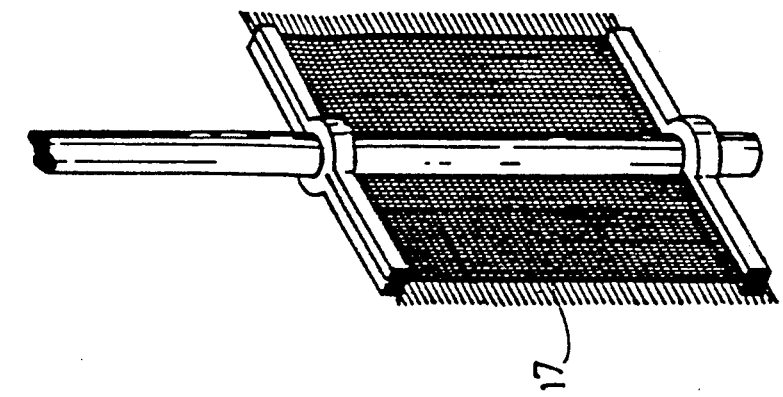

FIG. 5 shows a variation of the preceding case, in which two sheets 17 are provided and are formed of woven fibers.

EXAMPLE 1

In this example, a filling in the form of felted sheets is used, arranged according to FIG. 4.

The characteristics of the felt were the following:
material: polyester felt;
diameter of fibers: 30 microns;
height of each sheet: 20 cm;
width of each sheet: 25 mm;
thickness: 10 millimeters;
specific coefficient of void of each sheet: 0.96;
coefficient of void of the assembly of filling with respect to the useable volume of the enclosure: 0.98.

The enclosure has a diameter of 5 cm, a useable height of 20 cm and a total height of 30 cm.

The emulsion treated in this example is a secondary type, of kerosene dispersed in water and having a relatively large granulometric spectrum of between 2 and 40 microns; it contains material in suspension, such as bentonite, having a particle diameter of less than 50 microns. The inlet concentration of hydrocarbons is 330 mg/l and the concentration of material in suspension is on the order of 200 mg/l.

The speed of rotation of the felt filling was 200 rpm, corresponding to an average tangential speed of 0.26 m/s (speed at mid-radius). The axial flow speed of the emulsion in the coalescing enclosure was 0.1 cm/s. The ratio of the average tangential speed of the filling to the axial flow speed is therefor on the order of 260.

The analyses carried out on the incoming effluent and on the aqueous phase at the outlet have comprised measuring the total oxygen demand after passage through ultrasonic treatment.

These analyses have shown that the yield of separation obtained was on the order of 98.5%, which represents an average residual concentration of hydrocarbons of 5 mg/l in the aqueous phase. This effluent may be discharged without constituting a nuisance, directly to the outlet of the separator. The operation of the apparatus remained stable over time, the materials in suspension being purged in proportion as and being entrained by the aqueous phase. No tendency toward clogging was observed.

A granulometric study of residual water (carried out on a "Coultronic" particle counter) has shown that all of the hydrocarbon droplets of a diameter greater than 10 microns were eliminated (with a yield of 100%) and that the droplets of a diameter on the order of 5 microns were eliminated with a yield of 80%.

This apparatus is therefor an excellent secondary emulsion or mixed emulsion separator.

EXAMPLE 2

This test is identical to the preceding, with the exception of the axial flow speed of the emulsion, which was adjusted to a much greater value: 0/3 cm/s. The ratio of the average tangential speed of the filling to the flow speed of the emulsion is thus 87. In this case, the overall average yield decreased slightly and was on the order of 96.4%, the average residual concentration being in the vicinity of 12 mg/l.

It was verified thus that the yield is as much better as the ratio of the tangential speed of the filling to the flow speed is great. The yield however remains very high for ratios greater than 150.

One non-quantified test permitted verifying that if the speed of rotation increased too greatly, the coalescing yield of large droplets (of a diameter greater than 30 microns) fell notably by reason of the phenomenon of refractionating mentioned above. In practice, one will adjust the ratio of the average speed of the filling to the flow speed of the emulsion to between 150 and 300.

EXAMPLE 3

This example is identical to Example 1, with the exception that rotational speed of the filling which has been adjusted to a lower value: 105 rpm. this speed corresponds to a ratio of the average speed of the filling to the emulsion flow speed equal to 137.

While satisfactory, the efficiency of separation is less than Example 1, the yield being 97.6%.

EXAMPLE 4

This example is carried out by means of fibers attached to a central shaft conforming to FIGS. 1 and 2, for forming a brush having a spiral shape.

The characteristics of the brush are as follows:
material: polyamide;
diameter of fibers: 0.1 mm;
spirals rolled in a joined manner to a height of 20 cm;
length of each fiber: 2.5 cm;
coefficient of void of the filling with respect to the useable volume of the enclosure: 83%.

The treated emulsion in this example was the same as in Example 1 and contained the same materials in suspension. The speed of rotation of the central shaft was adjusted to 200 rpm, the axial flow speed of the emulsion was 0.1 cm/s. The ratio of the average speed of rotation of the filling to the axial speed of flow is thus on the order of 260.

The analyses carried out showed that the separation yield is in this case on the order of 99.5%, which represents an average residual concentration of hydrocarbon 1.7 mg/l. The functioning of the apparatus remained stable over time, the materials in suspension purging themselves in proportion as and being entrained by the aqueous phase. No tendency to clogging was observed.

The granulometric study of the residual water showed that all hydrocarbon droplets of a diameter greater than 10 microns were eliminated with a yield of 100% and that the droplets of a diameter on the order of 5 microns were eliminated with a yield of 99%.

This apparatus is therefor a remarkable separator for a secondary or mixed emulsion.

EXAMPLE 5

This example is identical to Example 4, but with a much greater flow speed of the emulsion of 0.5 cm/s corresponding to a ratio of the average tangential speed of the fibers to the axial flow speed equal to 52.

The overall average yield obtained is on the order of 97.6%. This yield, while slightly less than that of the preceding example, remains remarkable.

EXAMPLE 6

This example is identical to Example 4, but the emulsion to be treated is an emulsion much more highly loaded with hydrocarbons having a concentration of 1250 mg/l.

In a manner somewhat unexpected, the average yield measured is close to 100%, the residual hydrocarbon remaining not being detectable by the analyses. This shows that the performances of the apparatus provide a very high probability of droplet/droplet or droplet/filling encounters.

EXAMPLE 7

This example is identical to Example 4, but the fibers used were fibers of a greater diameter equal to 0.3 mm, and the speed of rotation was 150 rpm corresponding to a ratio of the tangential speed of displacement of the filling to the axial speed of flow of 196. The coefficient of void of the filling was in this case 0.87.

The overall average yield is 96.5%, which represents an average residual concentration of hydrocarbon of 11.5 mg/l.

EXAMPLE 8

This example is identical to Example 4, but the spirals, instead of being joined, were spaced longitudinally with a pitch of 1 cm along the shaft, the speed of rotation thereof being 150 rpm.

The coefficient of void of the filling was in this case 0.89.

The overall average yield is 97.4%, which represents an average residual concentration of hydrocarbon of 8.6 mg/l.

We claim:

1. A process for the separation of one phase dispersed in emulsion or in suspension in a continuous phase of a different density comprising providing a coalescing enclosure having a filling formed of fibers or particles, said filling having a high coefficient of void and an inherent volume of particles or fibers of less than about 20% of the useable volume of said coalescing enclosure, causing the emulsion to circulate in said enclosure, causing said filling to move continuously in the enclosure in such a manner that the particles or fibers of said filling sweep the enclosure with an average speed of the particles or fibers greater than about 100 times the flow speed of the emulsion for producing a coalesced phase, and separately recovering the coalesced phase and the continuous phase at different levels from the enclosure.

2. A separation process as in claim 1, and wherein the fibers forming said filling have an inherent volume of between about 0.5% and 5% of the useable volume of the enclosure, and including moving said fibers at an average speed between about 150 and 300 times the flow speed of the emulsion.

3. A separation process as in claim 1 and wherein said enclosure extends along an axis and including circulating said emulsion in a direction parallel to said axis, and causing said filling to rotate about said axis so as to sweep the useable volume of said enclosure, with the peripheral edge of said filling in contact with said enclosure.

4. A separation process as in claim 1 and wherein said filling is of a material preferentially wetted by the dispersed phase.

5. A process as in claim 1 for separating a hydrocarbon phase dispersed in emulsion in a continuous aqueous phase comprising circulating said emulsion from the bottom toward the top of the coalescing enclosure, and recovering the hydrocarbon and the aqueous phase in the top portion at different levels.

6. An apparatus for separation of a dispersed phase in emulsion or suspension in a continuous phase of different density comprising a coalescing chamber (1) extending along an axis, an emulsion inlet (2) situated at one end of said chamber, a coalesced phase outlet (4) and a continuous phase outlet (5) situated at the opposite end of said chamber at different levels, a rotatable support (8, 10) associated with the coalescing chamber, means for causing rotation of said support (9) and a filling (11, 12, 14, 17) formed by fibers connected to said support, said filling having a high coefficient of void and an inherent volume of fiber less than about 20% of the useable volume of said coalescing chamber (1), said filling (11, 12) comprising a plurality of radial fibers connected to a central shaft extending along the axis of the chamber, each fiber having a length adapted to sweep the transverse section of the chamber during rotation and to be in contact with said chamber at the extremity of the fiber.

7. A separation apparatus as in claim 6 and wherein said fibers are rolled in a spiral along the shaft (9) for forming a brush (11).

8. A separation apparatus as in claim 6 and wherein said fibers are attached along said support (13) parallel to a generatrix of the shaft (8) for forming linear brushes.

9. An apparatus as in claim 6 and wherein said filling comprises fibers having a diameter of about 0.1 to 0.5 mm.

10. An apparatus as in claim 6 for the separation of a hydrocarbon dispersed in water, and wherein said fibers are of a material selected from the group consisting of polypropylene, polyethylene, polyamide, polytetrafluoroethylene.

11. An apparatus for the separation of a dispersed phase in emulsion or in suspension of a continuous phase of different density comprising a coalescing chamber (1) extending along an axis, an emulsion inlet (2) at one end of said chamber, a coalesced phase outlet (4) and a continuous phase outlet (5) at the other end of said chamber at different levels, a rotatable support (8, 10) associated with said coalescing chamber (4), means for causing rotation of said support (9), and a filling (11, 12, 14, 17) formed of fibers connected to said support, said filling having a high coefficient of void and an inherent volume of fiber less than about 20% of the useable volume of said coalescing chamber (1), said filling (14, 17) being formed by at least one sheet of felted or woven fibers supported on a central shaft by upper and lower arms (15, 16), said sheets being of a dimension adapted to cover at least a longitudinal half-section of the chamber.

12. A separation apparatus as in claim 11 and wherein said filling has an inherent volume of fibers of between about 0.5% and 5% of the useable volume of the chamber.

13. A separation apparatus as in claim 11 and wherein said rotating means (9) causes a continuous rotation of the support such that:

$$\frac{750}{D} < N < \frac{1500}{D},$$

wherein N is the speed of rotation expressed in revolutions per minute and D is the average diameter of the chamber expressed in cm.

* * * * *